United States Patent Office 3,386,915
Patented June 4, 1968

3,386,915
PROCESS FOR THE MANUFACTURING OF CHLORINE DIOXIDE IN SOLUTION AND THE USE OF THE SOLUTION THUS OBTAINED
Robert Rutschi, Schlieren, Zurich, and Rudolph Gehring, Rekingen, Aargau, Switzerland, assignors to Solvay & Cie, Societe Anonyme, Brussels, Belgium, a Belgian corporation
No Drawing. Continuation-in-part of application Ser. No. 438,101, Mar. 8, 1965. This application Aug. 23, 1967, Ser. No. 662,563
Claims priority, application Switzerland, Mar. 18, 1964, 3,464/64
11 Claims. (Cl. 210—62)

ABSTRACT OF THE DISCLOSURE

An at least 5% solution of $NaClO_2$ is mixed with a 250 to 300% molar excess of an at least 5% solution of HCl in the presence of catalyst to produce $ClO_2$, useful for disinfecting swimming pool water.

This application is a continuation-in-part of our copending applicatoin Ser. No. 438,101, filed Mar. 8, 1965.

Background of the invention

The present invention relates to a process of manufacturing chlorine dioxide in solution and also to the use of the solution thus obtained for disinfecting the water of swimming pools.

Up to now chlorine dioxide has been manufactured principally from chlorates, which for this purpose are reacted with reducing agents in acid solution. Other processes are also known for manufacturing chlorine dioxide by starting from chlorites, particularly sodium chloride. Although sodium chlorite may be manufactured by starting from chlorine dioxide, these processes remain important because, unlike chlorine dioxide, sodium chlorite is transportable. Chlorine dioxide may be produced from sodium chlorite for example by reaction with chlorine (preferably in the presence of sulphuric acid), with nitrogen peroxide, with nitrogen trichloride or with hydrochloric acid alone. By virtue of the low cost of the starting materials, the latter process is of particular importance, in spite of the fact that only 0.8 mole of chlorine dioxide is theoretically obtainable per mole of sodium chlorite according to the equilibrium reaction:

$$5NaClO_2 + 4HCl \rightleftarrows 4ClO_2 + 2H_2O + 5NaCl$$

In practice only 85% at most of the abovementioned theoretical value has been attained hitherto.

Summary of the invention

The object of the present invention is an improved process for the manufacture of chlorine dioxide in aqueous solution starting from sodium chlorite and an acid, particularly hydrochloric acid, characterized in that an at least 5% solution of acid in a molar excess of 250 to 300% calculated with respect to sodium chlorite, is reacted with an at least 5% solution of sodium chlorite, in the presence of at least one catalyst which is preferably hydrogen peroxide, potassium persulphate, sodium persulphate, potassium perborate, sodium perborate, a sulphate of cobalt, nickel or copper, or sodium bisulphate or bisulphite. Other catalysts which may be employed are sodium chlorate, sodium perchlorate, organic compounds such as oxalic acid, tartaric acid, methyl alcohol, amyl acetate and similar substances.

Description of the preferred embodiments

The yield of the above-mentioned reaction between sodium chlorite and hydrochloric acid varies considerably according to the acid concentration. A solution of hydrochloric acid having a strength of 12% or more is particularly advantageously employed. For an excess of HCl of 250 to 300%, the hydrogen ion concentration of the reaction solution is below pH 0.5. With a 12% solution of HCl and an acid excess of 250 to 300%, the maximum yield is attained in a short reaction time, for example three minutes. At weaker concentrations a slightly longer reaction time may prove necessary.

The catalyst, for example a pre-compound, may be added to the hydrochloric acid or to the sodium chlorite solution. However, when it is added to the latter the concentration should be so chosen that the activating action does not start until after the addition of acid.

The yields which can be obtained according to the invention lie in general between 85 and 95% and in some cases even above 95%. The following table shows results obtained without catalysts and with the addition of various catalysts. It will be noted that in some instances the yield is not greater than is obtained without catalyst; however, without catalyst the reaction requires more time.

TABLE

General conditions:
  Concentration of $NaClO_2 = 10\%$.
  Concentration of $HCl = 12\%$.
Ratio of mixture:
  1/1, by volume.

| Catalyst | Quantity, g./l. | Catalyst added to— | Yield, Percent |
|---|---|---|---|
| No addition | | | 86 |
| Potassium or sodium persulphate | 1-10 | $NaClO_2$ | 95 |
| Potassium or sodium perborate | 1-10 | HCl | 95 |
| Cobalt sulphate | 10 | HCl | 89 |
| Nickel sulphate | 10 | HCl | 89 |
| Sodium perchlorate | 10-2 | HCl | 92-89 |
| Sodium chlorate | 10 | HCl | 89 |
| Sodium bisulphate | 10-1 | HCl | 92-86 |
| Sodium bisulphite | 5 | $NaClO_2$ | 89 |
| Oxalic acid | 10 | HCl | 88 |
| Tartaric acid | 10 | HCl | 89 |
| Methyl alcohol | 10 | HCl | 89 |
| Amylacetate | 10 | HCl | 87 |
| Hydrogen peroxide (100%) | 10 | HCl, $NaClO_2$ | 86-86 |

Example 1

In a first vessel is provided a 10% solution of sodium chlorite containing 2 grams per liter of sodium persulphate. In a second vessel is provided a 12% solution of hydrochloric acid. The two solutions are passed into a reaction zone, in the volume ratio 1:1, and are mixed there for about 10 minutes at room temperature. The yield of chlorine dioxide is 95%.

Example 2

The procedure of Example 1 is followed but with the replacement of the catalyst used in that example by 5 grams of sodium perborate per liter of sodium chlorite solution. The yield of chlorine dioxide is 95%.

Example 3

In a first vessel is provided a 5% solution of sodium chlorite containing 2 grams per liter of sodium persulphate. In a second vessel is provided a 6% solution of hydrochloric acid. The two solutions are passed into a reaction zone, in the volume ratio 1:1, and are mixed there for about 10 minutes at room temperature. The yield of chlorine dioxide is greater than 90%.

Example 4

The procedure of Example 3 is followed but with a 7.5% rather than 5% solution of sodium chlorite and a 9% rather than 6% solution of hydrochloric acid. The yield of chlorine dioxide is greater than 95%.

The acid solution of chlorine dioxide obtained according to the process of the invention can be used directly for disinfecting water. Its use for disinfecting water in swimming pools is particularly advantageous. Here advantages are to be found as a result of the absence of disagreeable odor and taste as well as the reduction in the irritant effect on the skin and on the mucous membranes, in comparison with that found with the usual disinfection procedure with chlorine. The pH of the water treated by the solution obtained according to the invention is adjusted to a preferred value lying between 7.0 and 7.4, using a suitable separate pH regulator.

The quantity of solution obtained according to the invention to be added to the water depends partly on the degree of pollution of the water. In general, favorable results are obtained when the swimming pool water contains 0.1 to 0.5 milligram per liter of chlorine dioxide.

In comparison with the known processes for treating swimming pool water with chlorine dioxide produced from sodium chlorite and hydrochloric acid, the process according to the invention is noteworthy in that the increased yields of chlorine dioxide considerably limit the quantity of chlorite ions present. This is particularly advantageous for treating swimming pool water and the like in a closed circuit, since it is known that the presence therein of chlorite ions is undesirable, on the one hand because they hinder analyses of oxidation products in the water and on the other hand because above a certain concentration they can cause physiological trouble (cf. Berndt-Stadtehygiene, 1953, 4, p. 131).

While the invention has been described by reference to particular embodiments thereof, such description is not intended to limit the scope of the invention, obvious modifications and variations being intended to be included within the scope of the appended claims.

What we claim and desire to secure by Letters Patent is:

1. Method of manufacturing aqueous chlorine dioxide solutions from sodium chlorite and hydrochloric acid, the solutions being particularly suitable for disinfecting swimming pools, comprising reacting an at least 5% solution of sodium chlorite with an at least 5% solution of hydrochloric acid, the hydrochloric acid being used in a molar excess of 250 to 300% with respect to the sodium chlorite, in the presence of an activator selected from the group consisting of hydrogen peroxide, potassium persulphate, sodium persulphate, potassium perborate, sodium perborate, sulphates of cobalt, of nickel and of copper, sodium bisulphate, sodium bisulphite, sodium chlorate, sodium perchlorate, oxalic acid, tartaric acid, methyl alcohol and amyl acetate.

2. Method of disinfecting swimming pool water comprising adding to the swimming pool water an aqueous solution of chlorine dioxide made by the method of claim 1 and maintaining the pH of the swimming pool water at a value between 7.0 and 7.4.

3. Method according to claim 2, in which the quantity of the aqueous solution of chlorine dioxide added to the swimming pool water is such that the concentration of chlorine dioxide in the swimming pool water is 0.1 to 0.5 milligram per liter.

4. A method according to claim 1 wherein an at least 10% solution of said sodium chlorite is reacted with an at least 10% solution of said hydrochloric acid.

5. A method according to claim 1 wherein said activator is sodium or potassium perborate.

6. A method according to claim 1 wherein said activator is sodium perchlorate.

7. A method according to claim 1 wherein said activator is sodium bisulphate.

8. A method according to claim 1 wherein said activator is cobalt, nickel or copper sulphate.

9. A method according to claim 1 wherein said activator is sodium chlorate.

10. A method according to claim 1 wherein said activator is sodium bisulphite.

11. A method according to claim 1 wherein said activator is sodium persulphate or potassium persulphate.

References Cited

UNITED STATES PATENTS 3,082,146  3/1963  Wentworth et al. _____ 167—17

FOREIGN PATENTS 121,074  2/1946  Australia.
1,007,745  5/1957  Germany.
558,960  1/1944  Great Britain.
610,148  10/1960  Italy.

MICHAEL E. ROGERS, *Primary Examiner.*